Aug. 15, 1944.   C. M. GRIFFIN   2,355,723
MOUNTING FOR BEARINGS
Filed Dec. 11, 1941
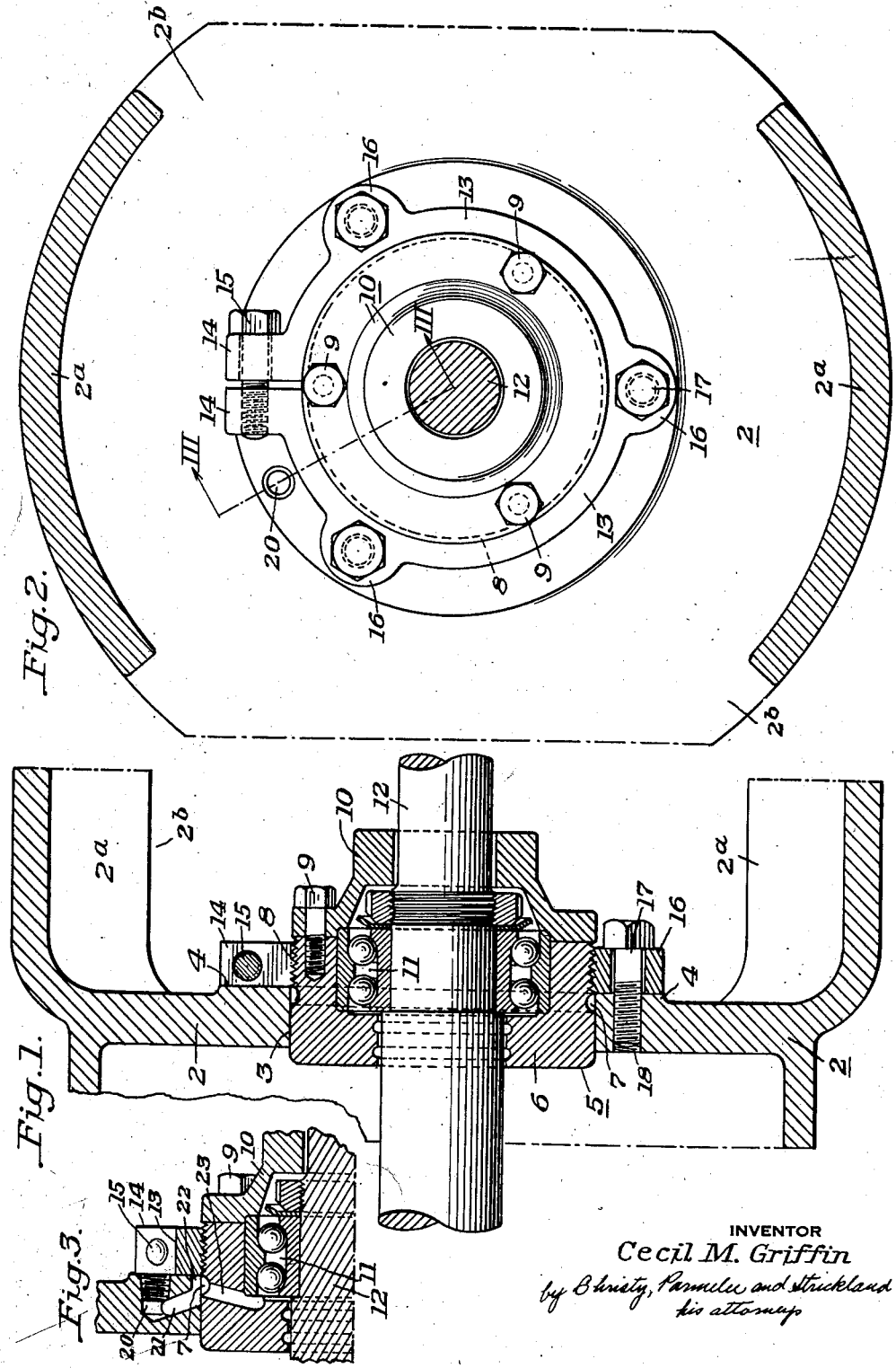
INVENTOR
Cecil M. Griffin
by Christy, Parmelee and Strickland
his attorneys Patented Aug. 15, 1944

2,355,723

UNITED STATES PATENT OFFICE 2,355,723

MOUNTING FOR BEARINGS

Cecil M. Griffin, Pittsburgh, Pa.

Application December 11, 1941, Serial No. 422,487

4 Claims. (Cl. 308—189)

This invention relates to bearing mounting and housing devices such as are used in connection with the bearings needed on rotating shafts in various types of machinery, and relates particularly to mountings which provide a ready and accessible means of making longitudinal adjustment of the shaft, and also provides for rigid clamping of the bearing and mounting assembly to the motor or machine frame, thus reducing vibration and run-out of the shaft to a minimum.

In various types of machinery it is necessary or desirable to make longitudinal adjustment of the shafts for the purpose of adjusting clearances and taking up wear.

And in some cases, particularly in the case of centrifugal pumps wherein the pump impeller is attached directly to the overhanging end of the motor shaft, and wherein the speeds of rotation of the shafts are often comparatively high, it is important that the bearing mounting be of compact design so that the length of overhang of the shaft can be reduced, resulting in a truer running shaft, a smaller shaft, and a more compact pump or machine.

The invention is more fully understood by reference to the accompanying drawing, in which Figure 1 is a vertical section through the bearing and mounting embodying my invention;

Figure 2 is a plan view of the bearing and mounting shown in Figure 1;

Figure 3 is a fragmentary section on the plane of line III—III of Figure 2, showing the lubricating passage for the adjustable bearing.

In the drawing, 2 designates the housing or frame of a machine. For example, 2 may be one end of a motor frame having integral webs 2a projecting forwardly therefrom and which in turn are connected at their other ends to the casing or frame of a pump, leaving spaces 2b through which the only access to the bearing hereinafter described is afforded. Reference to a pump is alluded to only as indicating one place where the invention is applicable and not as indicating that the present invention is for improvements in pumps per se.

The supporting member 2 has an opening 3 therein and on one face thereof there is a raised surface 4 which is machined to provide a seat for the clamp ring hereinafter described. The cartridge type bearing mounting indicated generally as 5 is set in the opening 3. This bearing mounting comprises a cylindrical housing or cartridge 6 having a peripheral groove 7 thereon and having an externally threaded portion 8. Removably attached by means of bolts 9 to the cylindrical body 6 is a cover member 10. A conventional ball-bearing arrangement 11 is provided within the cartridge 6 and the details of this form no part of the present invention. The bearing however, is constructed to assume some of the endwise thrust on the shaft so that longitudinal movement of the cartridge 6 imparts longitudinal movement to the shaft which is designated 12.

For adjustably securing the cartridge 6 in the housing or frame 2 there is provided a split clamping ring 13, this split ring having opposed lugs 14 thereon. A bolt 15 passes through one of these lugs and is screwed into the other one so that by adjusting the bolt 15 the split ring, which is internally threaded and which engages the threaded surface 8 on the shell or cartridge 6, may be loosened or tightened. The split ring 13 is also provided with a plurality of lugs 16 having openings therethrough. A bolt 17 is passed through the opening in each lug and this bolt is screwed into a tapped hole 18 in the structure 2. The face of the ring 13, as shown in Figure 1, lies against the surface 4 on the frame of the machine. The holes through the lugs 16 are, as shown in Figure 1, larger than the diameter of the bolts 17.

To adjust the bearing, access is afforded to the bolt 15 and to the bolts 17 through the openings 2b between the webs 2a in the frame of the macine. The operator loosens the bolts 16 without removing them and he loosens the bolt 15. He may then turn the shell 6 with its cover member 10 one way or the other relatively to the collar 13, the screw threads 8 on the exterior of the shell 6, turning in the screw threads on the inside of the collar, causing the bearing to move longitudinally with respect to the collar. The bearing may be turned either a small amount or a considerable extent, depending on whether a very fine or a large increment of adjustment is necessary and when the desired adjustment has been made the bolt 15 is tightened to tighten the clamp of the split clamping ring 13 onto the threaded section 8 of the shell. This prevents further relative turning of the bearing with respect to the ring 13. The bolts 16 are then tightened down, firmly clamping the ring 13 to the frame 2 of the machine. When this has been done the bearing is rigidly supported against excessive vibration or chatter. At the same time a very compact construction is provided which enables the bearing to be quickly and easily adjusted and which enables the adjustment to be made without access to both ends of the bearing shell. In other words, if 2 is a motor housing and the armature is at the left side of the structure 2 as viewed in Figure 1, it is only necessary to have access to the right end of the bearing, i. e., that part to the right of the structure 2, to make the adjustment. Since in machinery of the type in which the present bearing mounting will be used the speeds are usually quite high, it is of special importance that the bearing be rigidly held to prevent vibration and chatter. Also, since compactness is usually desired in machines of this type, the compactness of the bearing mounting is a matter of considerable importance.

Where it is desirable to lubricate the bearing the design provides for such lubrication. A lubricating arrangement is illustrated in Figures 2 and 3. The surface 4 of the supporting frame 2 is provided with an opening 20 which may be a simple oil opening or which may be internally threaded to receive a lubricating fitting (not shown). At the inner end of the hole 20 there is a radially extending channel 21 with a horizontally extending offset 22. The passage 21 and the offset 22 register with the annular groove 7 on the shell of the bearing. The shell 6 may be provided with one or more radial passages 23 leading from the annular groove 7 to the ball races as clearly shown in Figure 3. No matter to what angle the cartridge 6 is turned, a lubricant can be forced through the opening 20 into the channel 21—22 into the annular groove 7 and from the annular groove through the channel 23 to the bearings. The passage 21—22 is elongated in the direction of axis of the shaft, so as to amply overlap groove 7 and provide a passage for lubricant throughout the total range of adjustment of the bearing, which in most machinery need be only a fraction of an inch. The fit between the shell or housing 6 must be close to prevent leakage of the lubricant. It must not, however, be so tight as to prevent ready movement in making the adjustments described above.

While the description depicts a structure wherein the clamping ring 13 is threaded and screwed onto the shell 6 it is apparent that the same compact structure and rigid clamping of the shell could be obtained if the clamping ring and that portion of the shell 6 upon which it fits were smooth bored and turned, and some other means of applying force to cause longitudinal adjustment of the shaft were provided. Various other changes and modifications are also contemplated by the invention and are within the scope of the following claims.

I claim:

1. A bearing structure comprising a cartridge type bearing housing, a clamping ring in which the housing is longitudinally adjustable and which may be clamped to said housing to prevent relative movement between the housing and ring, and relatively adjustable means for releasably attaching the ring to a support.

2. A bearing structure comprising a cartridge type bearing housing having a cylindrical exterior, a split clamping ring encircling the exterior of the housing, means for tightening the split ring onto the housing to releasably restrain the ring and housing against relative movement lugs projecting from spaced points on the ring, said lugs having openings therethrough and bolts loosely received in the lugs for rigidly attaching the ring to a support.

3. A bearing structure comprising a cartridge type bearing housing having an exteriorly threaded peripheral portion, a split clamping member encircling the threaded portion of the housing and having threads therein which engage the threads on the housing, means for tightening the split clamping member onto the housing to releasably restrain the clamping member and housing against relative movement, and relatively adjustable means for rigidly attaching the clamping member to a support.

4. A bearing structure comprising a supporting web having an opening therethrough, a cartridge type bearing housing received within the opening, said housing having a portion which is exteriorly threaded and another portion which is provided with an annular groove, the housing having an oil duct leading inwardly from the annular groove, a split clamping collar engaging the threaded portion of the shell, means for detachably securing the clamping collar to the web, the supporting web having a lubricant-receiving duct therein, the duct terminating in said opening in the support in which the bearing is received, the terminal of the duct overlapping the groove in the shell of said bearing in the range of positions over which the bearing may be adjusted.

CECIL M. GRIFFIN.